(12) United States Patent
Cinquina

(10) Patent No.: US 6,629,600 B2
(45) Date of Patent: Oct. 7, 2003

(54) CD CONTAINER IN ELASTICALLY FLEXIBLE MATERIAL AND PUNCHED SHEET FOR THE MANUFACTURE THEREOF

(76) Inventor: Giuliano Cinquina, Via Vella 27/1, Pescara (IT)

( * ) Notice: Subject to any disclaimer, the term of this patent is extended or adjusted under 35 U.S.C. 154(b) by 0 days.

(21) Appl. No.: 09/862,266

(22) Filed: May 22, 2001

(65) Prior Publication Data

US 2002/0125153 A1 Sep. 12, 2002

Related U.S. Application Data

(63) Continuation of application No. PCT/IT99/00373, filed on Nov. 18, 1999.

(30) Foreign Application Priority Data

Nov. 27, 1998 (IT) .......................................... MI98A2576

(51) Int. Cl.[7] .............................................. B65D 85/30
(52) U.S. Cl. .................... 206/312; 206/308.1; 206/303; 206/307
(58) Field of Search ................................ 206/303, 307, 206/308.1, 312, 308.3; 229/68.1

(56) References Cited

FOREIGN PATENT DOCUMENTS

| DE | 296 03 053 U1 | 7/1996 |
| DE | 296 20 996 U1 | 2/1997 |
| DE | 298 13 045 U1 | 9/1998 |
| WO | WO 93/21086 A1 | 10/1993 |

*Primary Examiner*—Mickey Yu
*Assistant Examiner*—Troy Arnold
(74) *Attorney, Agent, or Firm*—Akin Gump Strauss Hauer & Feld, L.L.P.

(57) ABSTRACT

CD container essentially formed of a box body obtained by suitably folding a punched sheet material, comprising a substantially rectangular bottom wall (5) connected along one side to an above-lying front wall (8), which is also substantially rectangular, but shorter than the bottom wall (5) and is provided, at the center thereof, with a round hole (7) having a diameter slightly longer than that of the CDs, between which there is interposed a bearing face (3) shorter than said walls (5, 8) and partially surmounted on two opposite sides by a holding-back fin (2) and by a retaining tongue (13) respectively, the structure of said box body being completed by a couple of side fins (9 and 10) of the front wall (8) folded backwards and inserted between the bearing face (3) and the bottom wall (5). The sheet material is punched according to the accompanying drawings.

5 Claims, 5 Drawing Sheets

Fig. 3
A 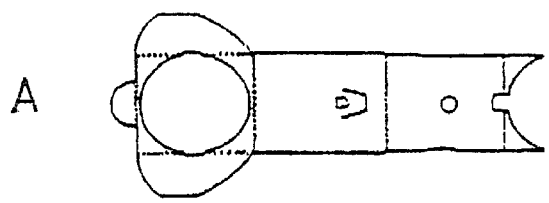
B 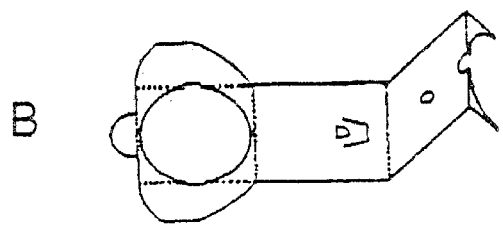
C 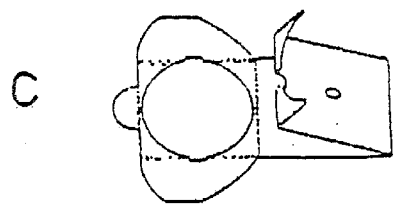
D 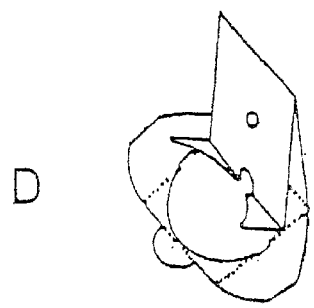
E 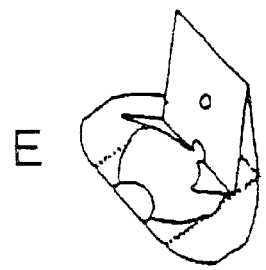
F 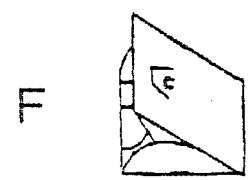
G 
H 

CD CONTAINER IN ELASTICALLY FLEXIBLE MATERIAL AND PUNCHED SHEET FOR THE MANUFACTURE THEREOF

CROSS-REFERENCE TO RELATED APPLICATION

This application is a continuation of International Application No. PCT/IT99/00373, filed Nov. 18, 1999, the disclosure of which is incorporated herein by reference.

BACKGROUND OF THE INVENTION

The present invention relates to a container for compact disks made with preferably ecological, elastically flexible sheet material, as well as the punched sheet for the manufacture thereof.

Compact disks, briefly referred to as CDs, are known to be at present marketed in three types of containers. The most common type is formed of an at least partly transparent, synthetic material rigid box, suitable for containing and holding the CD as well as paper material printed with the title and further information about the CD content. A more recent type is formed of a synthetic material plate, suitably shaped in order to accommodate and hold the CD together with a paper component suitable to be printed and to cover the CD arranged in the plate. The third type is made of paper material and is formed of a small box that can be opened or of a simple envelope.

All the known containers are in some way disadvantageous. For instance, the containers made of synthetic material, besides polluting if spread in the environment, can easily splinter and become cutting. The presently known containers in paper material, are either not suitable for holding the disk firmly in the container, which is the case with the envelopes, or they cannot contain also printed material or, finally, they cannot be used in more complex packages such as the so-called digi-boxes or digi-packs. There are also CD holders consisting of a blank made of paper which can be folded to form a package for the disk. CD holders of this kind are for example disclosed in DE 29603053, DE 29620996 and WO 93/21086. However, none of the said know CD holders have a round hole opening on the top side of the container with a diameter being slightly larger than a CD and is a disadvantage because the disk is not easliy and properly accomidated in the holder.

BRIEF SUMMARY OF THE INVENTION

Therefore, an object of the present invention is providing s CD container which is free from the above mentioned disadvantages. Another object of the present invention is to provide a punched sheet for the manufacture of said container. Said objects are achieved according to the present invention by a container having the features specified in claim 1 and a punched sheet having the features specified in claim 4.

An advantage of the present invention is that the container forming subject matter thereof, besides being suitable to be manufactured in paper material, and therefore being non-polluting, has a structure capable to hold firmly the CD in its seat even when the container is open, therefore ensuring a safe handling of the assembly.

Another advantage of the present invention is that the CD container forming subject matter thereof can be easily used in the more complex packages such as the so-called digi-packs and digi-books known to those which are skilled in the art.

A further advantage of the present invention is that the punched sheet material forming subject matter thereof is very thin compared to the more common containers and therefore allows noteworthy reductions of the costs for transport and storage at the record company, which can produce the containers on the spot according to the momentary needs.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 3 shows the succession of the operations for folding-up the sheet material until achievement of the container according to the present invention;

DETAILED DESCRIPTION OF THE INVENTION

Figure 1:
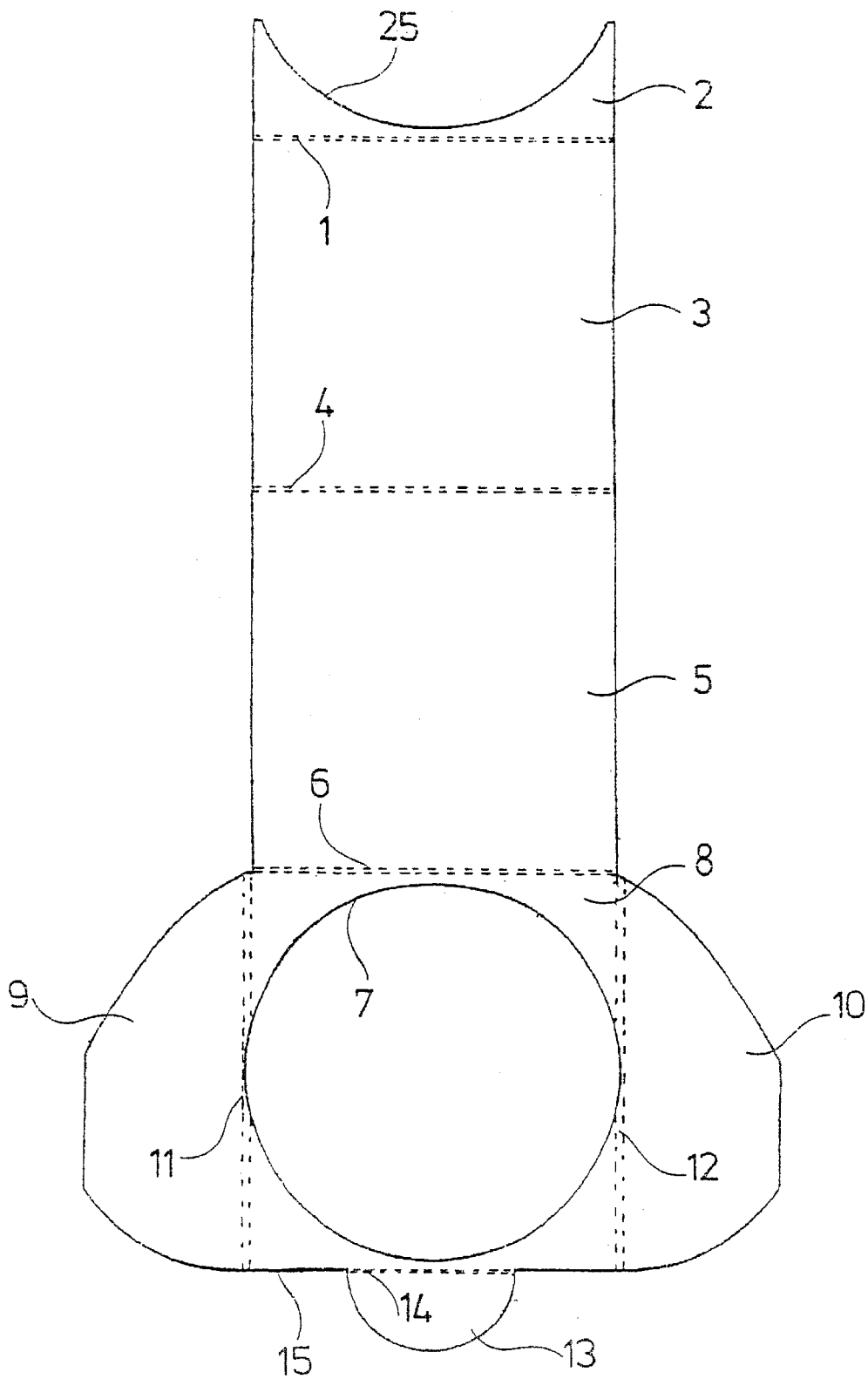
FIG. 1 shows a plan view of the punched sheet material according to the present invention.

With reference to FIG. 1, the sheet material to be used for the manufacture of the container according to the present invention is shown to have a substantially rectangular shape, having one end with an arched recess and the opposite end provided with two side fins and one tongue, as well as with one round hole having a diameter which is slightly longer than that of a normal CD. Said sheet can be obtained from any suitable material, preferably from board, by simple punching of the outlines and edging of the folding lines in order to define the functional portions described in the following.

The initial part with the arched recess is intended to be folded backwards along a folding line 1, next to that recess, so as to rest on the back face of an adjacent rectangular portion. This is intended to form the bearing face 3 of the CD which will be partly covered laterally by said arched end which will actually act as the CD holding-back fin 2.

The bearing face 3 is delimited on one side by folding line 1 and on the other side by folding line 4. It can be turned over along folding line 4 so as to be superimposed to an adjacent rectangular portion which is intended to act as a bottom wall 5 of the container according to the present invention. The whole body of bottom wall 5 together with the superimposed bearing face 3 and holding-back fin 2 are intended to be covered by the adjacent portion which is provided with round hole 7 and can be folded over said whole body along a folding line 6, parallel to folding lines 1 and 4. All these folding lines have the same length and define the common sides of the above-mentioned adjacent portions. The two sides defined by lines 4 and 6 will form as many sides of the box body which will be manufactured with the punched sheet. The other two sides of the box body will be formed by the free sides of the bearing face 3 and of the bottom wall 5, as well as by folding lines 11 and 12.

Round hole 7 is made at the center in a substantially rectangular portion which is intended to act as the front wall 8 of the container according to the present invention. Hole 7, as already said hereinabove, has a diameter slightly longer than that of the CDs and therefore allows the passage thereof through the front wall 8 in order to put them in position on the underlying bearing face 3. This is positioned above bottom wall 5 when the punched sheet of FIG. 1 is folded over in order to form a box body which is the container according to the present invention.

The dimensions of bottom wall 5 are about equal to those of front wall 8, while the dimensions of bearing face 3 are comparatively smaller, having the main side shorter than that of the two walls 5 and 8.

In order to transform the punched sheet into a box body, said sheet is provided with two side fins 9 and 10 which are intended to be folded backwards along folding lines 11 and 12 respectively. At the same time as said folding, the external ends of side fins 9 and 10 have to be inserted between bearing face 3 and bottom wall 5, so as to form in a stable way the box body of the container according to the present invention.

Further, the punched sheet of FIG. 1 is provided with a terminal tongue 13 which is intended to be folded backwards along folding line 14 so as to be interposed between bearing face 3 and front wall 8 when the container is mounted. When the CD is inserted in the container and laid on bearing face 3, the edge thereof will be inserted above tongue 13 which will act as a counterpart or retainer of the CD on bearing face 3. In such a position the disk, kept on the opposite side by holding-back fin 2, is firmly held in its seat and the container can even be turned upside down without any risk that the disk comes out.

It is worth while noting that in the container according to the present invention the disk is held by its periphery, along two arches of a circumference and not centrally along the circumference of the CD hole like in the presently known containers. This allows the container thickness to be notably reduced, because the known elastic bodies, which in the known containers keep the disk centrally and are characterized by a considerable thickness especially when compared to the thickness of the disk itself, can be avoided.

It is convenient that tongue 13 is folded backwards before that the side fins are inserted between face 3 and bottom wall 5 in order to form stably the box body which forms the container according to the present invention.

According to a preferred variant of the present invention, tongue 13 can be obtained by cutting an additional rectangular portion (which is not shown in the figure because it is optional), having dimensions comparable to those of the front portion 8 and being foldable over it along a folding line coincident with the margin 15 of the punched sheet material of FIG. 1. Said optional additional portion can act as the container lid, and it can also provide two additional surfaces for printing titles, explanatory texts and/or promotional messages. It can be also partially o completely transparent.

All folding lines are obtained by simple edging of the punched sheet material. The folding lines 6, 11 and 12 are preferably double and parallel. The distance between the parallels is approximately coincident with the CD thickness.

Figure 2:
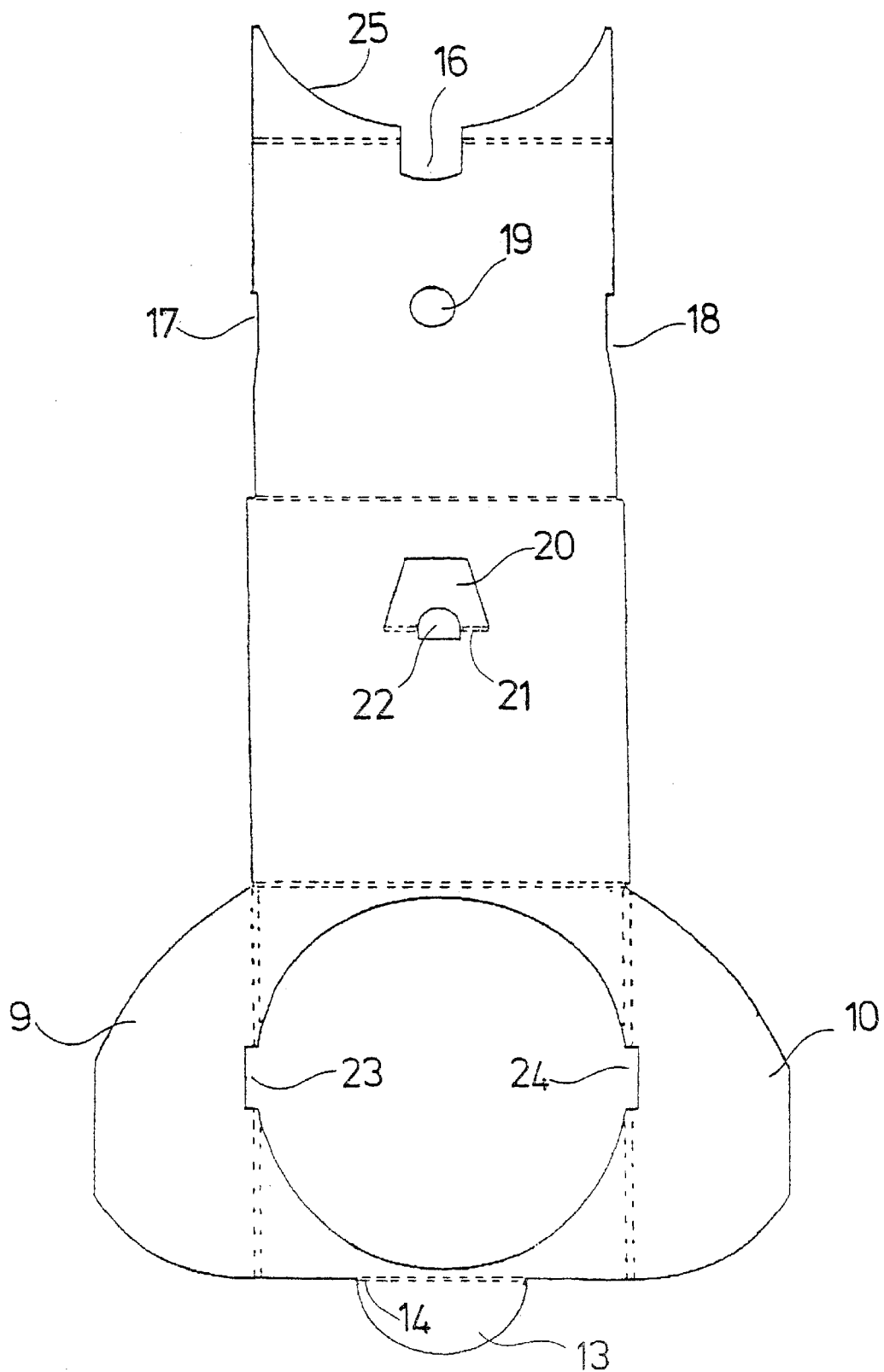
FIG. 2 shows a different embodiment of the sheet material according to the present invention.

With reference to FIG. 2 another embodiment of the material in punched sheet according to the present invention is shown. In said embodiment the sheet material is provided with further functional profiles of optional kind.

One of said optional profiles is the flag appendix 20 which is cut along the vertical axis of bottom wall 5. Said appendix has three free sides and one side which is integral with bottom wall 5 along folding line 21. Appendix 20, once spread with glue, is useful for fixing the container to the base boards of complex packages such as digi-packs or digi-books.

Another optional profile useful when the container has to be mounted on a support in the more complex packages is recess 16, having a substantially rectangular shape, provided in the central portion of holding-back fin 2. Recess 16, when fin 2 is folded over bearing face 3, forms a loop on the circumference thereof. Said loop leaves enough free room for the passage of one finger that, in such a way, is able to seize the CD circumference more easily when the CD is being taken out from the container according to the present invention.

On the other two sides of bearing face 3, two other optional profiles are present, consisting in the small recesses 17 and 18. Corresponding recesses 23 and 24, diametrically opposed along the circumference of hole 7, are provided. These four recesses are also useful for allowing to seize more easily the CD edges when the CD is being inserted into the container or when it is being taken out from the same container when this is not mounted on a support.

In this case, another optional profile is hole 19 which is positioned at the center of bearing face 3 and has about the same diameter of the CD hole. Even this hole serves for ensuring a more easy seizing of the CD because it leaves a larger room to the forefinger tip which is normally used for getting a hold of the CD central hole when the container is mounted on a support.

A further optional profile is the hole indicated in the figure with 22 which is made in bottom wall 5 at a certain distance from folding line 21, in order to allow users having a small hand, which have some difficulties in compressing the container at the same time on the two sides, such as children, to get a good hold.

In FIG. 3, with the illustrations from A to G, the different folding-up phases of the punched sheet material of FIG. 1 are graphically shown up to the formation of the container according to the present invention, shown in plan view in illustration H. The resulting box body has a strong structure suitable for adequately receiving, holding and protecting a CD. Said strong structure is rigid if it is laterally compressed along the two opposite sides corresponding to folding lines 11 and 12 of fins 9 and 10. On the contrary, it is elastically deformable if it is pressed against the other two opposite sides which are formed by folding lines 6 and 4 of bottom wall 5. In fact, bottom wall 5 is suitably dimensioned with the main side longer than that of front wall 8, which is in turn longer than bearing face 3. In such a way, by pressing at the same time towards the center the two container sides formed by folding lines 6 and 4, bottom wall 5 bends outwards so much that bearing face 3 is slit axially to the compression, until the edge of arched recess 25, which is provided on holding-back fin 2, is coincident with the rim of round hole 7. In such a position round hole 7 will be completely accessible to the CD which will be therefore easily introduced into or pulled out from the container.

Once pressure on said opposed sides has been released, the disk edge gets inserted on one side under holding-back fin 2 and on the other side under front wall 8. By compressing again axially the same two opposed sides, a new bending of bottom wall 5 is produced, bringing the edge of arched recess 25 provided on holding-back fin 2 to correspond with that of hole 7 until the disk is allowed to pass through the hole itself.

Figure 4:
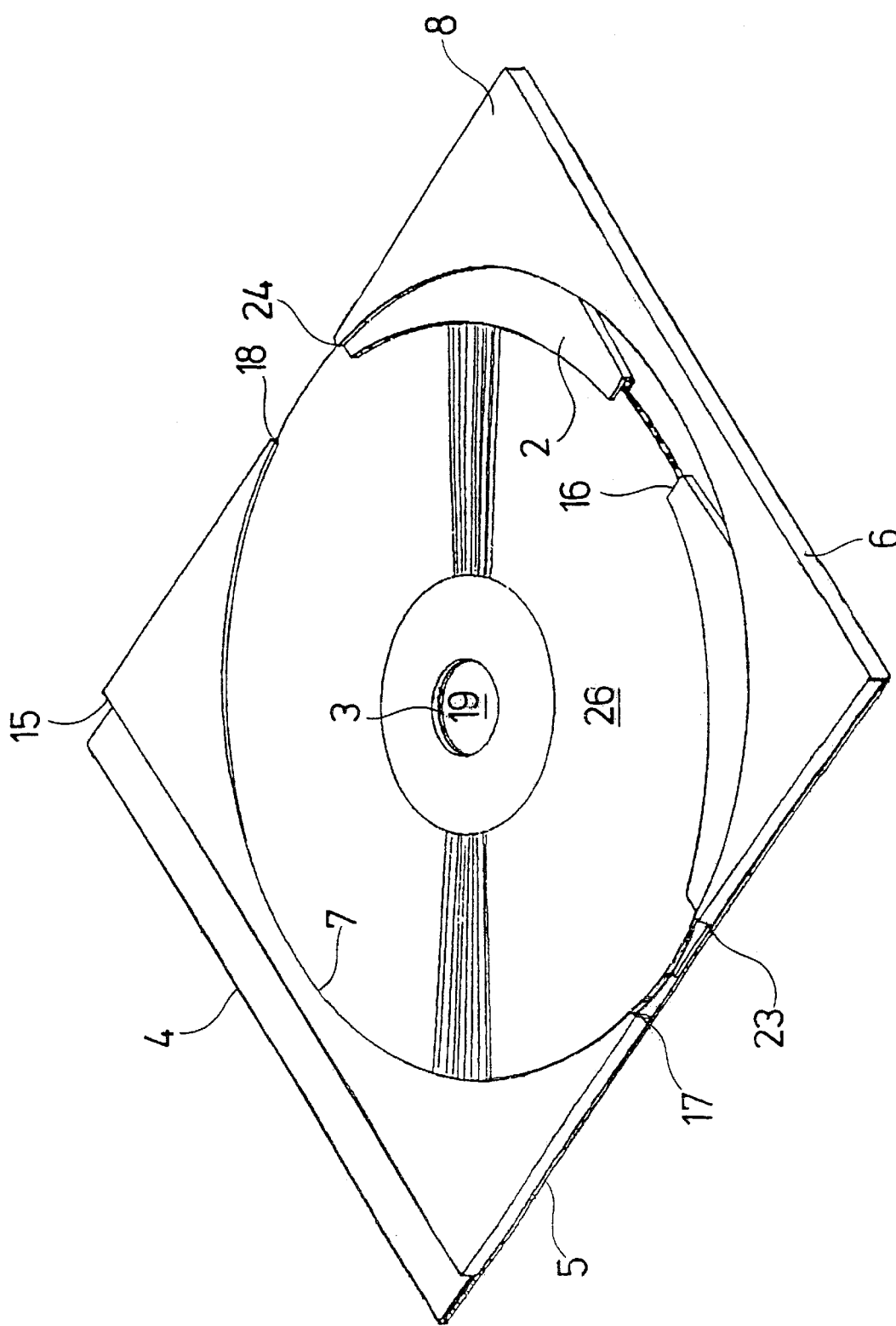
FIG. 4 shows a prospective view almost in the actual size of the container according to the present invention in extended position and with the CD incorporated.

With reference to FIG. 4, the CD container according to the present invention is shown to be formed essentially of a box body obtained by suitably folding the punched sheet material shown in FIGS. 1 and 2. Said box body comprises a bottom wall 5 and a front wall 8 having at the center a round hole 7 whose diameter is slightly longer than that of the CDs, between which a bearing face 3, shorter than wall 5 and partially surmounted on one side by a holding-back fin 2, is interposed. The structure of the box body is completed by the couple of side fins 9 and 10 which are inserted between bearing face 3 and bottom wall 5 and therefore cannot be seen in the figure.

In the figure there is also shown a CD 26 positioned inside the container and visible from the outside through round hole 7 of front wall 8. Through hole 7 it is possible to spot also holding-back fin 2 which holds the CD by its edge, by getting a hold along the circumference thereof.

In FIG. 4 are shown also loop 16 and recesses 17 and 18 as well as hole 19, that are three optional profiles used for making easier the operations of insertion of the CD into the container and/or taking out from the same container.

Figure 5:
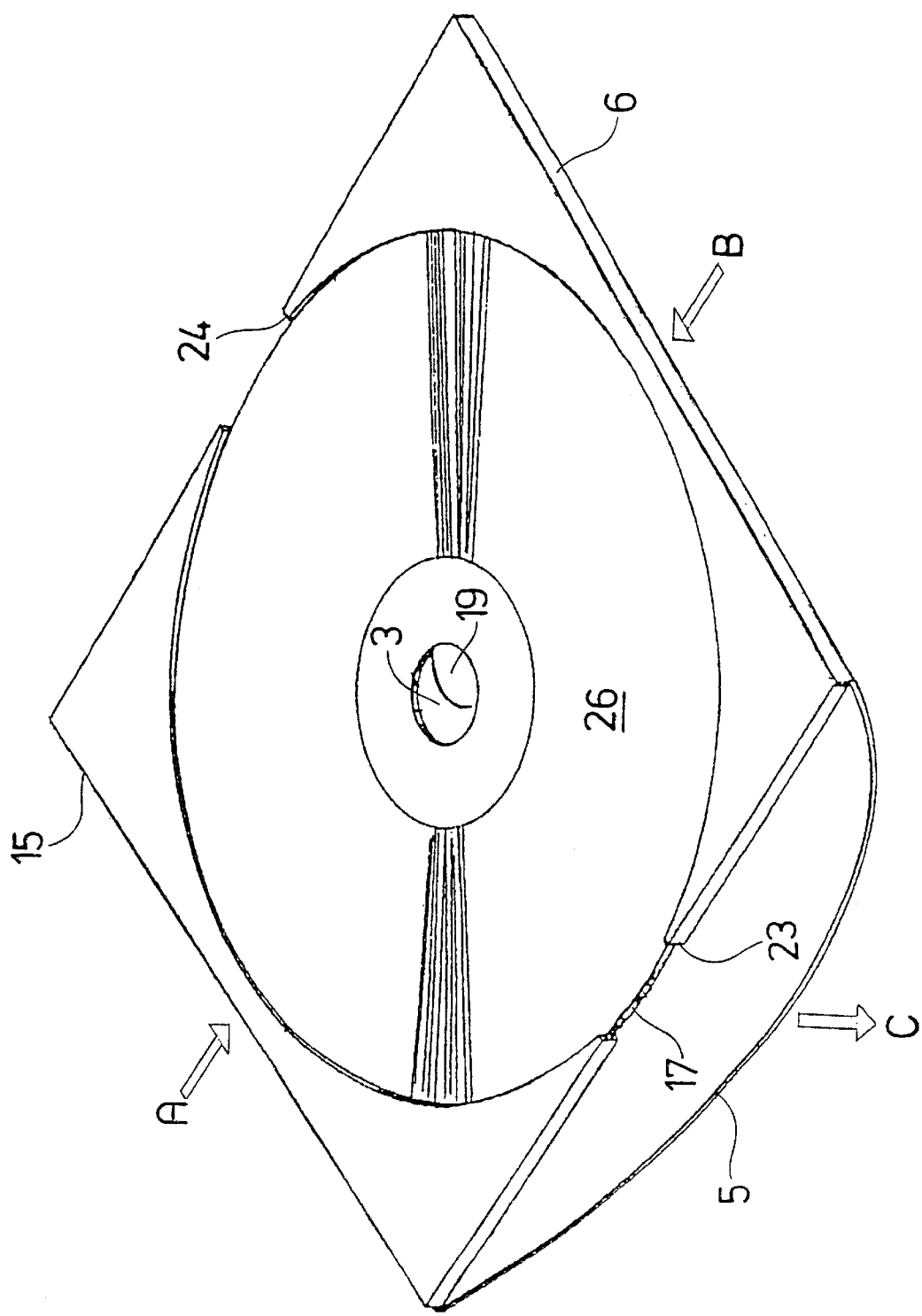
FIG. 5 shows the same container in compressed position ready for pulling out the disk.

In FIG. 5 the procedure for taking out and/or inserting the disk in the container is shown. Having exerted an axial compression along two arrows A and B on the two flanks of the container corresponding to the shorter sides thereof, downwards bending of bottom wall 5 was caused, according to arrow C, until the edge of arched recess 25 of holding-back fin 2 was coinciding with the edge of round hole 7 provided at the center of the above-lying front wall 8. In such a position of the container, the CD 26 is not any more hold by holding-back fin 2 or by front wall 8, and therefore it can be easily passed through round hole 7.

The container according to the present invention can be manufactured with any suitable material. For the notable ecological advantages the preferred material is certainly board. This material is normally provided with a sufficient stiffness that allows the bottom wall of the container to bend elastically for an undetermined number of times. The container bottom wall 5, besides forming the bottom element of the container, practically is the elastic element which controls the horizontal translation movement of bearing face 3. Said movement is opposed by bottom wall 5 which first bends, but then, when the axial compression is over, causes the reversal of the movable portion of the box body, that is bearing face 3 (possibly with the disk lying over it), in its rest position.

Any other, even composite, material having the above mentioned characteristics can be advantageously used for obtaining the punched sheet material according to the present invention and for the subsequent manufacture of the CD container.

The above described embodiments shown in the accompanying drawings have been reported only as a non-limiting example of the invention. Additions and/or modifications can be therein introduced by those which are skilled in the art, remaining within the scope of the invention itself One of said additions could be for example the lengthening of the punched sheet so as to insert between bottom wall 5 and bearing face 3 two other substantially rectangular faces having the same dimensions of bearing face 3 and connected between them along a folding line parallel to the others already described above. When the punched sheet is folded up for mounting the container according to the present invention, the various faces are multiple-folded along the parallel folding lines so that the two added faces are positioned under bearing face 3, thus forming a kind of pocket between it and bottom wall 5. Said pocket, whose opening is turned towards the opposite side with respect to fin 2, can be advantageously used for housing various printed materials, for example the so-called "books".

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A CD container constructed of a box obtained by folding a single punched sheet material for holding a CD, the CD container comprising:

a bearing wall panel (3);

a bottom wall panel (5) integral with the bearing wall panel (3) along a first fold line;

a front wall panel (8) integral with the bottom wall panel (5) along a second fold line that is parallel to the first fold line, the front wall panel (8) having a centrally located round hole (7) with a diameter that is slightly larger than a diameter of a CD;

the bearing wall panel, bottom wall panel and front wall panel being substantially rectangular in shape with the bearing wall panel (3) being interposed between the bottom wall panel (5) and the front wall panel (8);

a holding-back fin (2) mounted at one side of the bearing wall panel (3);

a terminal tongue (13) joined to the front wall panel (8) and folded back therefrom to hold an edge of a CD; and a pair of side fins (9, 10) joined to the front wall panel (8) and folded back therefrom, the side fins (9, 10) being inserted between the bearing wall panel (3) and the bottom wall panel (5);

wherein a CD positioned on the bearing wall panel (3) through the hole (7) is retained thereon by the holding-back fin (2) surmounting one edge of the disk while an opposite edge of the CD is lodged between the front wall panel (8) and said terminal tongue (13) folded back over the bearing wall panel (3), with both the holding-back fin (2) and the terminal tongue (13) being located in an area of the round hole (7).

2. A CD container according to claim 1, and further comprising a first pair of spaced recesses (17, 18) on the bearing wall panel (3) and a second pair of spaced recesses (23, 24) on the front wall panel (8) in alignment with the first pair of recesses for facilitating grasping of the CD edges.

3. A CD container according to claim 1, and further comprising an arched recess (25) on the holding-back fin (2) and a rectangular recess (16) extending from the arched recess (25).

4. An elastically flexible punched sheet material for manufacturing a CD container having a substantially rectangular shape and comprising:

a central panel (5) joined along a first folding line (4) to a first lateral panel (3) and along a second folding line (6) to a second lateral panel (8), the first lateral panel (3) being joined along a third folding line (1) to a fin (2) provided with an arched recess (25), the second lateral panel (8) having a round hole (7) centrally located therein with a diameter that is slightly larger than a diameter of a conventional CD, and two diametrically opposite side fins (9, 10) joined to the second lateral panel (8) respectively along fourth and fifth folding lines (11, 12) perpendicular to the first, second and third folding lines (1, 4, 6), and a terminal tongue (13) joined to the second lateral panel (8) along a sixth folding line (14), a first distance between the first folding line (4) and the second folding line (6) being larger than a second distance between the second folding line (6) and the sixth folding line (14), the second distance being in turn larger than a third distance between the first folding line (4) and the third folding line (1).

5. A punched sheet material according to claim 4, wherein the arched recess (25) has a radius of curvature substantially identical to a radius of the round hole (7).

* * * * *